United States Patent
Diggle, III et al.

(10) Patent No.: US 6,971,615 B1
(45) Date of Patent: Dec. 6, 2005

(54) LINE SUPPORT SYSTEMS

(75) Inventors: Frederick J. Diggle, III, Birmingham, AL (US); Martha F. Rowland, Birmingham, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/648,890

(22) Filed: Aug. 27, 2003

(51) Int. Cl.[7] .................................................. F16B 1/00
(52) U.S. Cl. ..................... 248/229.1; 182/5; 24/136 R
(58) Field of Search ........................ 248/229.1; 182/3, 182/5, 8; 24/136 R

(56) References Cited

U.S. PATENT DOCUMENTS

| | | | |
|---|---|---|---|
| 800,050 A | 9/1905 | Ayres | |
| 1,479,150 A | 1/1924 | Mellus | |
| 2,440,469 A | 4/1948 | Goddard | |
| 2,902,736 A * | 9/1959 | Hampe | 24/136 R |
| 2,946,619 A * | 7/1960 | Wahl | 294/74 |
| 3,144,695 A | 8/1964 | Budwig | |
| 3,289,983 A | 12/1966 | Mennerdahl | |
| 3,310,333 A * | 3/1967 | Hutson | 294/82.11 |
| 3,757,893 A * | 9/1973 | Hobbs | 182/6 |
| 3,791,663 A | 2/1974 | Allsop et al. | |
| 3,903,785 A * | 9/1975 | Pepper, Jr. | 248/694 |
| 4,019,609 A * | 4/1977 | Wagner | 188/65.4 |
| 4,441,233 A | 4/1984 | Swift | |
| 4,667,772 A * | 5/1987 | Kammerer | 182/6 |
| 4,765,037 A | 8/1988 | Perry | |
| 4,834,327 A * | 5/1989 | Byrne | 248/231.9 |
| D310,716 S | 9/1990 | Trask | |
| 4,990,157 A | 2/1991 | Roberts et al. | |
| 5,042,113 A | 8/1991 | Severson et al. | |
| 5,142,745 A * | 9/1992 | Setty et al. | 24/136 R |
| 5,150,504 A | 9/1992 | Cohen | |
| 5,199,137 A * | 4/1993 | Edwards | 24/136 K |
| 5,660,113 A * | 8/1997 | Lehotsky | 104/113 |
| 5,927,438 A * | 7/1999 | Ostrobrod | 182/241 |
| 6,073,315 A | 6/2000 | Rasmussen | |
| 6,119,993 A * | 9/2000 | Youngblood et al. | 248/231.9 |
| 6,283,426 B1 * | 9/2001 | Guthrie et al. | 248/231.9 |
| 6,712,181 B2 * | 3/2004 | Nichols | 182/192 |
| 6,732,981 B2 * | 5/2004 | Franks et al. | 248/74.1 |

OTHER PUBLICATIONS

Carrier Handline B 0A07710, Apparatus Equipment and Tools, BellSouth Products Catalog, Jan. 2003, p. 141.
U.S. Appl. No. 10/646,160 filed Aug. 22, 2003.
U.S. Appl. No. 10/645,950 filed Aug. 22, 2003.
U.S. Appl. No. 10/648,889 filed Aug. 27, 2003.

* cited by examiner

*Primary Examiner*—Anita M. King
(74) *Attorney, Agent, or Firm*—Potomac Patent Group PLLC

(57) ABSTRACT

Embodiments of the invention may include a line support system that may have a support member with an elongate body that may form a loop. The support member may be configured such that a positive biasing force may be provided at a distal end of the line support. The support member may have a first support arm and a second support arm that may be biased to abut one another and may be further capable of separating at the distal end of the line support when a sufficient force may be applied that overcomes the biasing force. The line support may also have an alignment retainer located at the distal ends of the first and second support arms that may be capable of assisting in positioning the first and second support arms in abutment so that they do not scissor. A bias adjustment mechanism may also be provided that may be selectively positionable about the first and second support arms and further may be configured such that the biasing force may be selectively adjustable.

17 Claims, 5 Drawing Sheets

LINE SUPPORT SYSTEMS

BACKGROUND

The subject invention generally and in various embodiments relates to line support systems, and more particularly to devices for supporting line or wire in a stable position. Hand line carriers for supporting lines or wires are generally known and used to support a line or lines to be carried by a technician. Hand line carriers are commonly attached to a technician climbing belt or body belt. These carrier devices generally release the line hanging through resilient arms of the carrier at the same amount of force regardless of the load to be supported. As such, existing hand line carriers may release line prematurely due to their construction. Another way of transporting a line or lines is for a technician to physically carry the line or lines. Yet another way is to loop the line directly through the belt of the technician.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting training programs and/or providing workers with a variety of support devices, support systems, backup devices and systems, and/or other means that promote the stability and safety of workers in elevated environments. Despite the best efforts of an organization to enhance the safety of its workers and reduce the risk of falling from elevated structures, for example, it is nonetheless difficult to eliminate all risks to workers performing work on such elevated structures.

Redundant systems for promoting safety of workers on elevated utility structures may thus sometimes be used. Such redundant systems can sometimes be beneficial in addition to the myriad of existing support systems, methods, devices and/or other apparatus employed by workers on elevated structures to reduce or mitigate risks associated with falling from utility structures, for example.

SUMMARY OF THE INVENTION

In accordance with various embodiments of the invention, there may be provided a line support. The line support may have a support member with an elongate body that may form a loop. The support member may be configured such that a positive biasing force may be provided at a distal end of the line support. The support member may have a first support arm and a second support arm that may be biased to abut one another and may be further capable of separating at the distal end of the line support when a sufficient force may be applied that overcomes the biasing force. The line support may also have an alignment retainer located at the distal ends of the first and second support arms that may be capable of helping to maintain the first and second support arms in abutment. A bias adjustment mechanism may also be provided that may be selectively positionable about the first and second support arms and further may be configured such that the biasing force may be selectively adjustable.

Embodiments of the present invention may include a line support system having a means for supporting a line. The means for support may have a positive biasing force provided at a distal end of the line support and the means for supporting may be biased to abut a separation in the means for supporting at the distal end of the line support and capable of separation when a sufficient force may be applied to overcome the biasing force. The line support may also have an alignment means located at the distal end of the means for supporting for maintaining the separation of the means for supporting in abutment. An adjustment means may also be provided for selectively adjusting the biasing force as the adjustment means may be selectively positionable about the means for supporting.

Embodiments of the present invention may also include a retrofit bias adjustment mechanism that may have a first support member and a second support member that may be positioned opposite the first support member. The second support member may be releasably affixed to the first support member on at least a distal end of the retrofit bias adustment mechanism. The retrofit bias adjustment mechanism may also have an intermediary support portion positioned between the first and second support members and may be releasably affixed to the first and second support members. The intermediary support portion may be located between the distal end and a proximal end of the retrofit bias adjustment mechanism. A securing support portion may also be releasably affixed to the first and second support members on the proximal ends of the first and second support members and may have a threaded bore therethrough. The threaded bore may have an adjustable fastener extending through it and may be capable of manipulating a biasing force when adjusted and employed on a line carrier.

Other systems, methods, features, and advantages of the present invention will be or become apparent to one with skill in the art upon review of the following drawings and detailed description. It is intended that all such additional systems, methods, features, and advantages be included within this description, be within the scope of the present invention, and be protected by the accompanying claims.

BRIEF DESCRIPTION OF THE DRAWINGS

In the accompanying Figures, there are shown embodiments of the present invention wherein like reference numerals are employed to designate like parts and wherein.

DESCRIPTION

Figure 1:
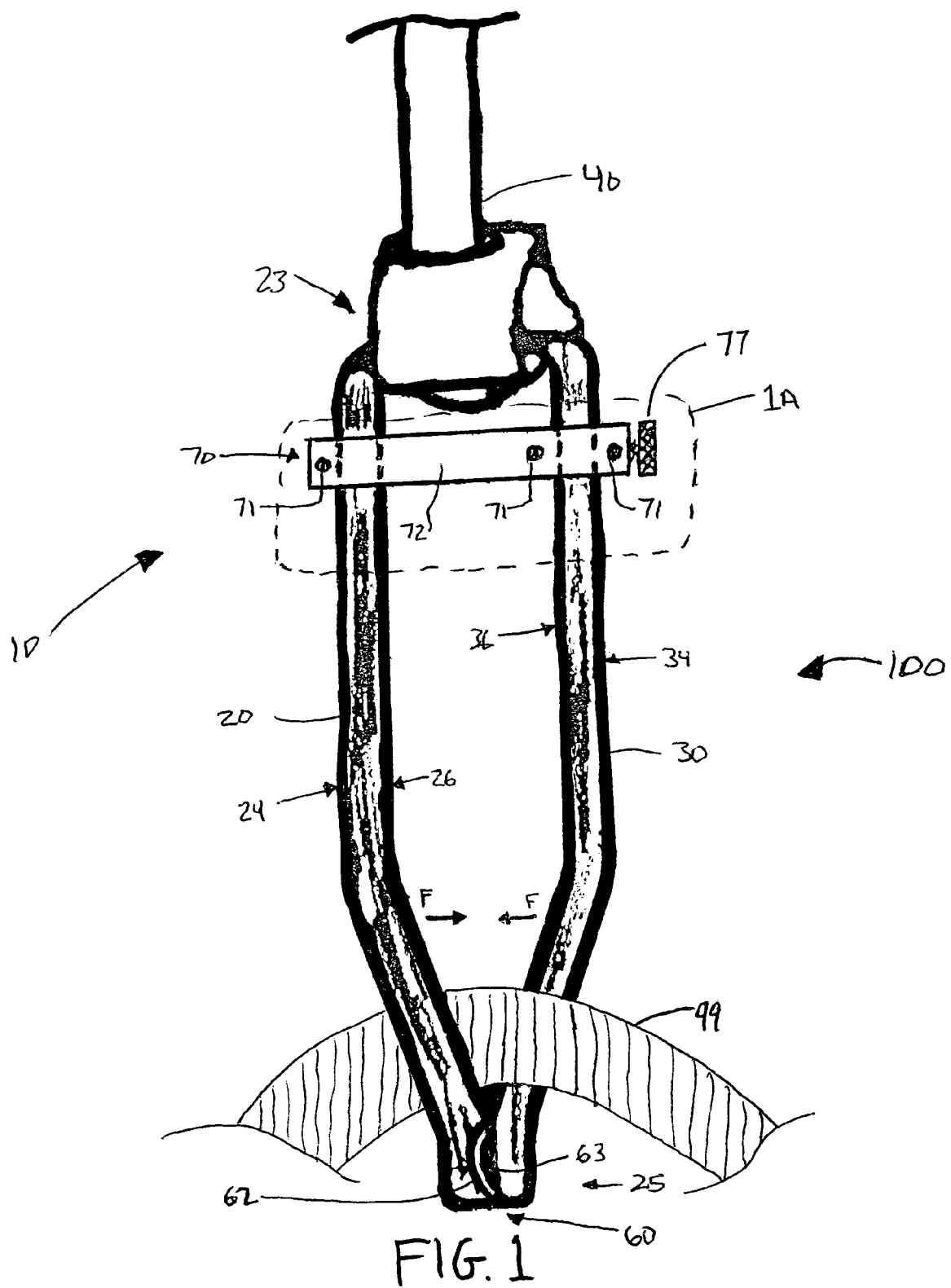
FIG. 1 is a front view of an embodiment of a line support of the present invention.

Referring now to the drawings for the purposes of illustrating embodiments of the invention only and not for the purposes of limiting the same, FIGS. 1–5 illustrate embodiments of the invention.

Figure 2:
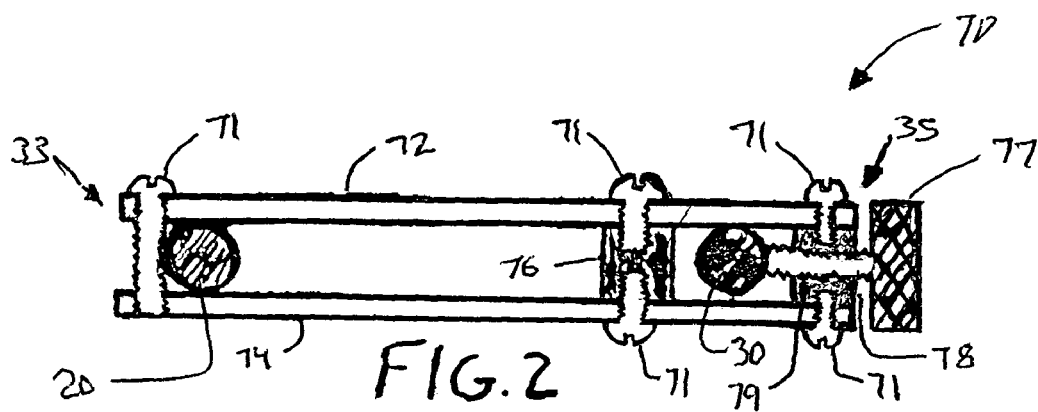
FIG. 2 is a cross-sectional view of the of the support member of FIG. 1A.
Figure 5:
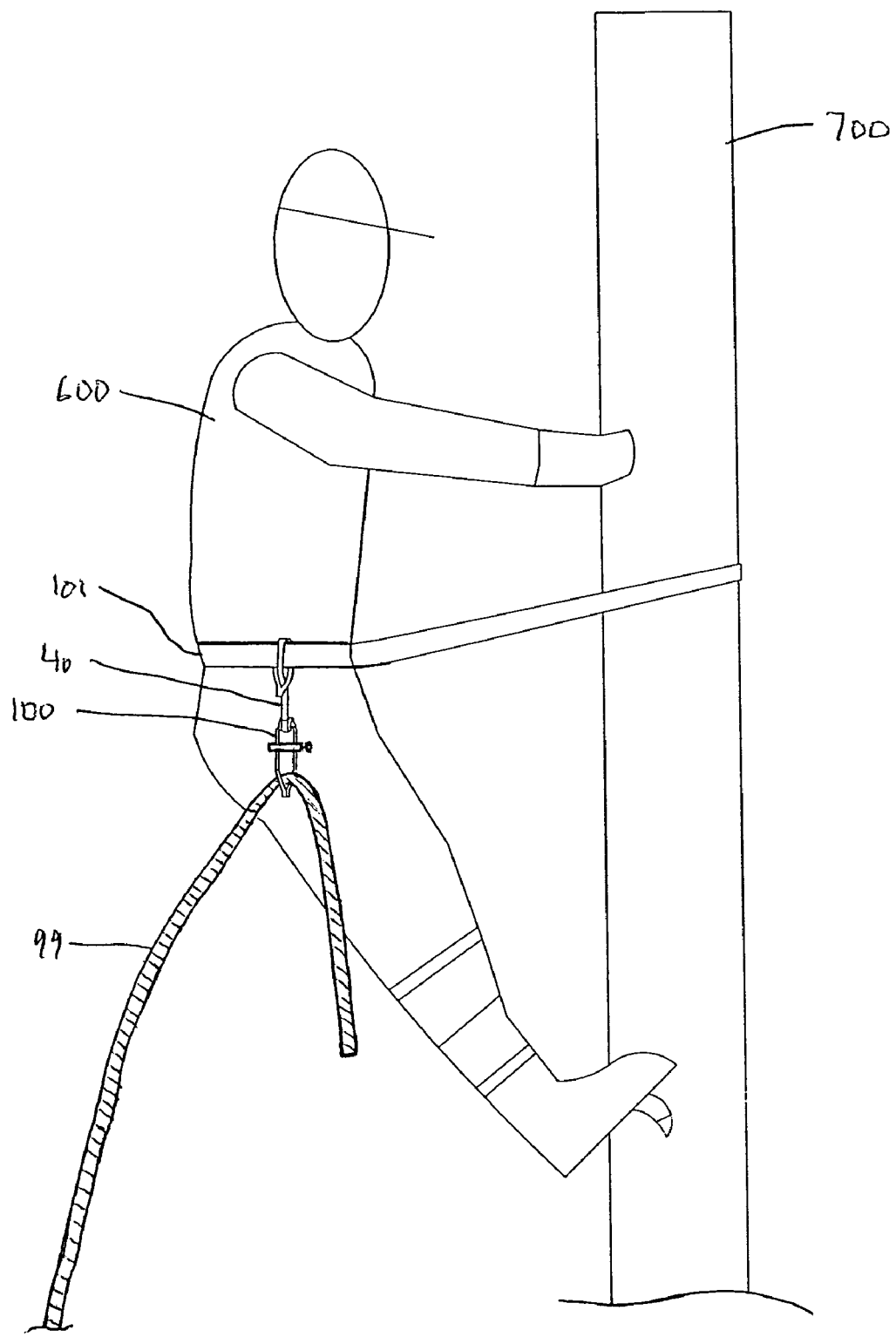
FIG. 5 is a side view of the line support of FIG. 1 as it may be employed.

FIGS. 1–2 illustrate embodiments of a line support 100. The line support 100 may include a support member 10 having an elongate body that may form a loop. The support member 10 may also have a first support arm 20 and a second support arm 30. The line support 100 may be optionally suspended from a strap 40 that may releasably attach to securing structures 101 such as, for example, a climbing belt, a belt loop, a body belt, etc. as illustrated in FIG. 5. The first support arm 20 and second support arm 30 may also be configured to provide support to a line or wire 99 when the line 99 may be positioned through the two support arms 20, 30.

First support arm 20 may have an elongated construction and may be opposite from the second support arm 30 wherein the first and second support arms 20, 30 may meet at a proximal end 23 of the support member 10 and may form an undivided body. First support arm 20 may also abut the second support arm 30 at a distal end 25 of the support member 10 wherein the first and second support arms 20, 30 may be separated. At the distal end 25 of the first and second support arms 20, 30, a positive biasing force F may be provided. The positive biasing force F may be found where the first support arm 20 has a constant force F pushing against the second support arm 30 at the distal end 25. Thus, first and second support arms 20, 30 may be biased to abut one another. First support arm 20 may have a first outer surface 24 and a first inner surface 26. First inner surface 26 may be used for supporting the line 99 when the support member 10 may be employed as will be discussed in greater detail below.

Second support arm 30 may have an elongated construction and may be opposite from the first support arm 20. As mentioned above, the first and second support arms 20, 30 may meet at the proximal end 23 of the support member 10 and may form an undivided body. Second support arm 30 may abut the first support arm 20 at the distal end 25 of the support member 10. The first and second support arms 20, 30 may also be separated at the distal end 25. As discussed above, at the distal end 25 of the first and second support arms 20, 30, a positive biasing force F may be provided. The positive biasing force F may be found where the second support arm 30 has a constant force F pushing against the first support arm 20 at the distal end 25. Thus, as mentioned above, the first and second support arms 20, 30 may be biased to abut one another. Second support arm 30 may have a second outer surface 34 and a second inner surface 36. Second inner surface 36 may be used for supporting the line 99 when the support member 10 may be employed.

The line support 100 may also have an alignment retainer 60. Alignment retainer 60 may be provided at the distal end 25 of the support member 10. The alignment retainer 60 may be provided to assist in positioning the first and second support arms 20, 30 in abutment. In other words, the alignment retainer 60 may assist in preventing the scissoring of first and second support arms 20, 30 that may be a result of the positive biasing force F. A protrusion 62 may be positioned on the distal end 25 of the first support arm 20 as shown in FIG. 1. A recess 63 may be provided opposite the protrusion 62 and may correspondingly mate with the protrusion 62. The protrusion 62 and corresponding recess 63 may be implemented in a number of fashions such as, for example, a ball and socket, a linear protrusion and linear recess, etc. The alignment retainer 60 may be configured to position and support the support member 10 such that the first and second support arms 20, 30 may be retained in an abutting position by the positive biasing force F. The line 99 may thus be prevented from being damaged, caught or potentially twisting out of the line support 100.

Positioned around the first and second support arms 20, 30 and in partial contact with the first and second outer surfaces 24, 34, may be a bias adjustment mechanism 70. The bias adjustment mechanism 70 may be of different configurations such as, for example, a coiled spring, an elastic member, etc., which will be discussed in greater detail below. Bias adjustment mechanism 70 may be freely positioned between the parallel portions of the first and second support arms 20, 30. The closer that bias adjustment mechanism 70 may be secured to the distal end 25, the greater the biasing force F may be provided from the support member 10 preventing the line 99 from slipping through the separation in the first and second support arms 20, 30 at the distal end 25. Indication marks (not shown) may additionally be provided to communicate the biasing force F created for a given position of the bias adjustment mechanism 70 and may further relate the biasing force F to a number of lines or wires that may be able to be carried up to some range of height or distance before the biasing force F would be overcome.

As shown in FIGS. 1–2, the bias adjustment mechanism 70 may also have a securing mechanism 77 such as, for example, a knurled screw, a thumbscrew, etc. which may adjust manually by hand. The bias adjustment mechanism 70 may be secured to one or both of the first and second support arms 20, 30 by engagement of the securing mechanism 77. As more than one securing mechanism 77 may be provided, one securing mechanism 77 on each side of the support member 10 may be provided to contact each of the first support arm 20 and the second support arm 30.

Figure 1A:
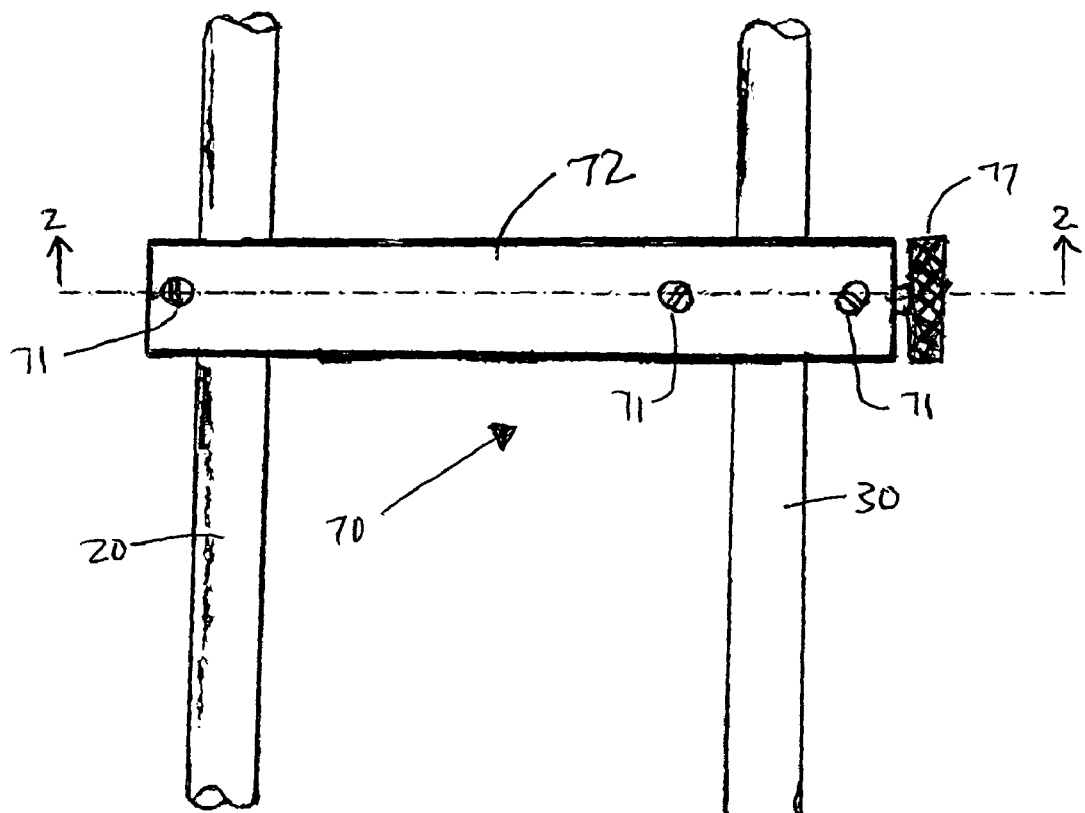
FIG. 1A is an enlarged view of the encircled portion of FIG. 1.

FIGS. 1A and 2 further illustrate embodiments of the bias adjustment mechanism 70 depicted in FIG. 1. A first support member 72 and a second support member 74 may be positioned opposite one another and may be affixed to each other on one end 33 by fastener 71. The bias adjustment mechanism 70 may also have an intermediary support portion 76 positioned between the first and second support members 72, 74 and affixed to the first and second support members 72, 74 by fasteners 71. The intermediary support portion 76 may be located between the first and second support arms 20, 30. In addition, a space may be provided between the intermediary support portion 76 and the second support arm 30 such that clearance may be provided. A securing support portion 78 may further be affixed to the first and second support members 72, 74 on another end 35 of the bias adjustment mechanism 70. The securing support portion 78 may have a threaded bore 79 therethrough for engaging the securing mechanism 77 which may be, for example, a knurled bolt, a thumbscrew, etc. The securing mechanism 77 may extend through the securing support portion 78 and may further engage the threaded bore 79. Due to the construction of the bias adjustment mechanism 70, the securing mechanism 77 may be capable of engaging at least one of the first and second support arms 20, 30 depending on the orientation of the bias adjustment mechanism 70. Thus, when the securing mechanism 77 may be loosened and the bias adjustment mechanism 70 slid up or down and secured to the support member 10, the biasing force F may be manipulated that may retain the line 99. Bias adjustment mechanism 70 may be removable and may be capable of retrofitting onto other hand line carriers.

Referring back to FIG. 1, the line support 100 may be employed having the line 99 positioned through the first and second support arms 20, 30. In this embodiment, the line 99 may be retained in a supported position due to the biasing force F that may be provided by the line support 100. To support the line 99, the bias adjustment mechanism 70 may be positioned at any desired position on the parallel portions of the first and second support arms 20, 30 so that the force F required to overcome the biasing force F may be adequate for the carrying task. The distal end 25 may be separated so as to open the first support arm 20 away from the second support arm 30 when a force sufficient to overcome the biasing force F may be applied. To increase the biasing force F, the bias adjustment mechanism 70 may be moved toward the distal end 25 and secured by the securing mechanism 77. As can be seen in the drawings, bias adjustment mechanism 70 has been positioned near the proximal end 23. As discussed above, this position provides a lesser biasing force F than if the bias adjustment mechanism 70 were moved closer to the distal end 25. As discussed above, the alignment retainer 60 may assist in preventing the line support 100 from scissoring.

Figure 3:
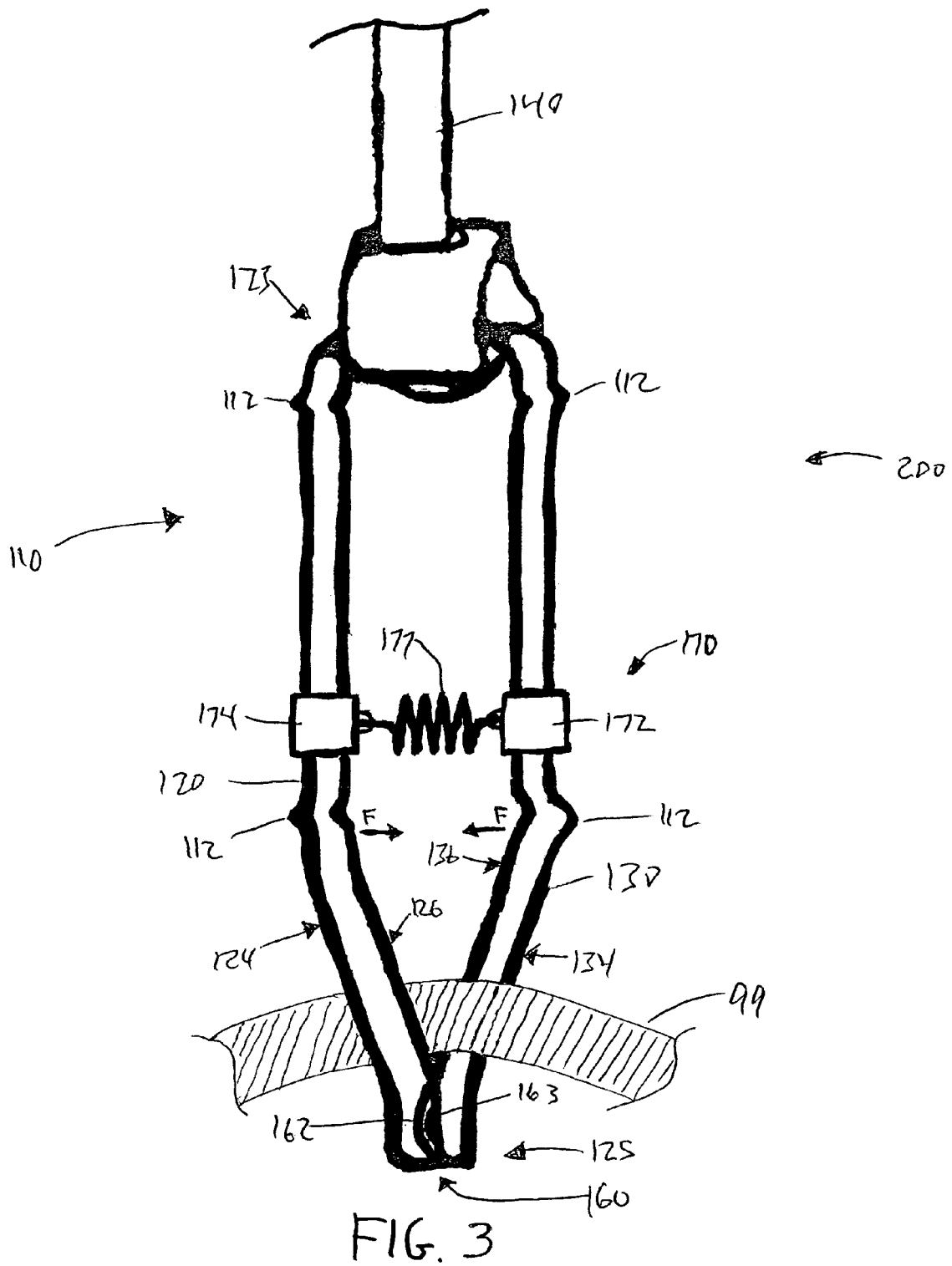
FIG. 3 is a front view of an embodiment of a line support of the present invention.

FIG. 3 illustrates embodiments of a line support 200 of the invention as described below. The line support 200 may generally include a support member 110 having an elongate body that may form a loop. Support member 110 may also have a first support arm 120 and a second support arm 130 having at least one stop 112. The line support 200 may be optionally suspended from a strap 140 that may releasably attach to securing structures 101 such as, for example, a climbing belt, a belt loop, a body belt, etc. The first support arm 120 and second support arm 130 may also be configured to provide support to a line or wire 99 when the line 99 may be positioned through the two support arms 120, 130.

First support arm 120 may have an elongated construction and may be opposite from the second support arm 130 wherein the first and second support arms 120, 130 may meet at a proximal end 123 of the support member 110 and may form an undivided body. First support arm 120 may also abut the second support arm 130 at a distal end 125 of the support member 110 wherein the first and second support arms 120, 130 may be separated. At the distal end 125 of the first and second support arms 120, 130, a positive biasing force F may be provided. The positive biasing force F may be found where the first support arm 120 has a constant force F pushing against the second support arm 130 at the distal end 125. Thus, first and second support arms 120, 130 may be biased to abut one another. First support arm 120 may have a first outer surface 124 and a first inner surface 126. First inner surface 126 may be used for supporting the line 99 when the support member 110 may be employed.

Second support arm 130 may have an elongated construction and may be opposite from the first support arm 120. As mentioned above, the first and second support arms 120, 130 may meet at the proximal end 123 of the support member 110 and may form an undivided body. Second support arm 130 may abut the first support arm 120 at the distal end 125 of the support member 110. The first and second support arms 120, 130 may also be separated at the distal end 125. As discussed above, at the distal end 125 of the first and second support arms 120, 130, the positive biasing force F may be provided. The positive biasing force F may be found where the second support arm 130 has a constant force F pushing against the first support arm 120 at the distal end 125. Thus, as mentioned above, the first and second support arms 120, 130 may be biased to abut one another. Second support arm 130 may have a second outer surface 134 and a second inner surface 136. Second inner surface 136 may be used for supporting the line 99 when the support member 110 may be employed.

The line support 200 may also have an alignment retainer 160. Alignment retainer 160 may be provided at the distal end 125 of the support member 110. The alignment retainer 160 may be provided to assist in positioning the first and second support arms 120, 130 in abutment. The alignment retainer 160 may assist in preventing the scissoring of first and second support arms 120, 130 that may be a result of the positive biasing force F. A protrusion 162 may be positioned on the distal end 125 of the first support arm 120 as shown in FIG. 3. A recess 163 may be provided opposite the protrusion 162 and may correspondingly mate with the protrusion 162. The protrusion 162 and corresponding recess 163 may be implemented in a number of fashions such as, for example, a ball and socket, a linear protrusion and linear recess, etc. The alignment retainer 160 may be configured to position and support the support member 110 such that the first and second support arms 120, 130 may be retained in an abutting position by the positive biasing force F. The line 99 may thus be prevented from being damaged, caught or potentially twisting out of the line support 200.

A bias adjustment mechanism 170 may be positioned around the first and second arms 120, 130 and in partial contact with the first and second outer surfaces 124, 134. The bias adjustment mechanism 170 may be, for example, a coiled spring, an elastic member, etc. Bias adjustment mechanism 170 may be freely positioned between the parallel portions of the first and second support arms 120, 130. The closer that bias adjustment mechanism 170 may be secured to the distal end 125, the greater the biasing force F may be provided from the support member 110. Indication marks (not shown) may additionally be provided to communicate the biasing force F created for a given position of the bias adjustment mechanism 170 and may further relate the biasing force F to a number of lines or wires that may be able to be carried up to some range of height or distance before the biasing force F would be overcome.

The bias adjustment mechanism 170 may also be secured to the first and second support arms 120, 130 by engagement of the first sliding portion 172 and the second sliding portion 174. The first sliding portion 172 and the second sliding portion 174 may be positioned opposite one another and may have an elastic biasing member 177 connected therebetween. The elastic biasing member 177 may be, for example, a coiled spring, a rubber band, etc. Due to the construction of the bias adjustment mechanism 170, the first and second sliding portions 172, 174 may be capable of engaging the first and second support arms 120, 130 and may slide up or down the support member 110 between the stops 112 to manipulate the biasing force F. The bias adjustment mechanism 170 may additionally be encased with, for example, a plastic box, a metal covering, etc.

The line support 200 may be employed as the line 99 may be positioned through the first and second support arms 120, 130. The line 99 may be retained in a supported position due to the biasing force F that may be provided by the line support 200. To support the line 99, the bias adjustment mechanism 170 may be positioned at any desired position on the parallel portions of the first and second support arms 120, 130 so that the force required to overcome the biasing force F may be adequate for the carrying task. The distal end 125 may be separated so as to open the first support arm 120 and the second support arm 130 apart from one another when a force sufficient to overcome the biasing force F may be applied. To increase the biasing force F, the bias adjustment mechanism 170 may be slid toward the distal end 125 until it reaches the stops 112. As can be seen in FIG. 3, bias adjustment mechanism 170 has been positioned near the distal end 125. As discussed above, this position provides a greater biasing force F than if the bias adjustment mechanism 170 were moved closer to the proximal end 123. The alignment retainer 160 may assist in preventing the line support 200 from scissoring.

Figure 4:
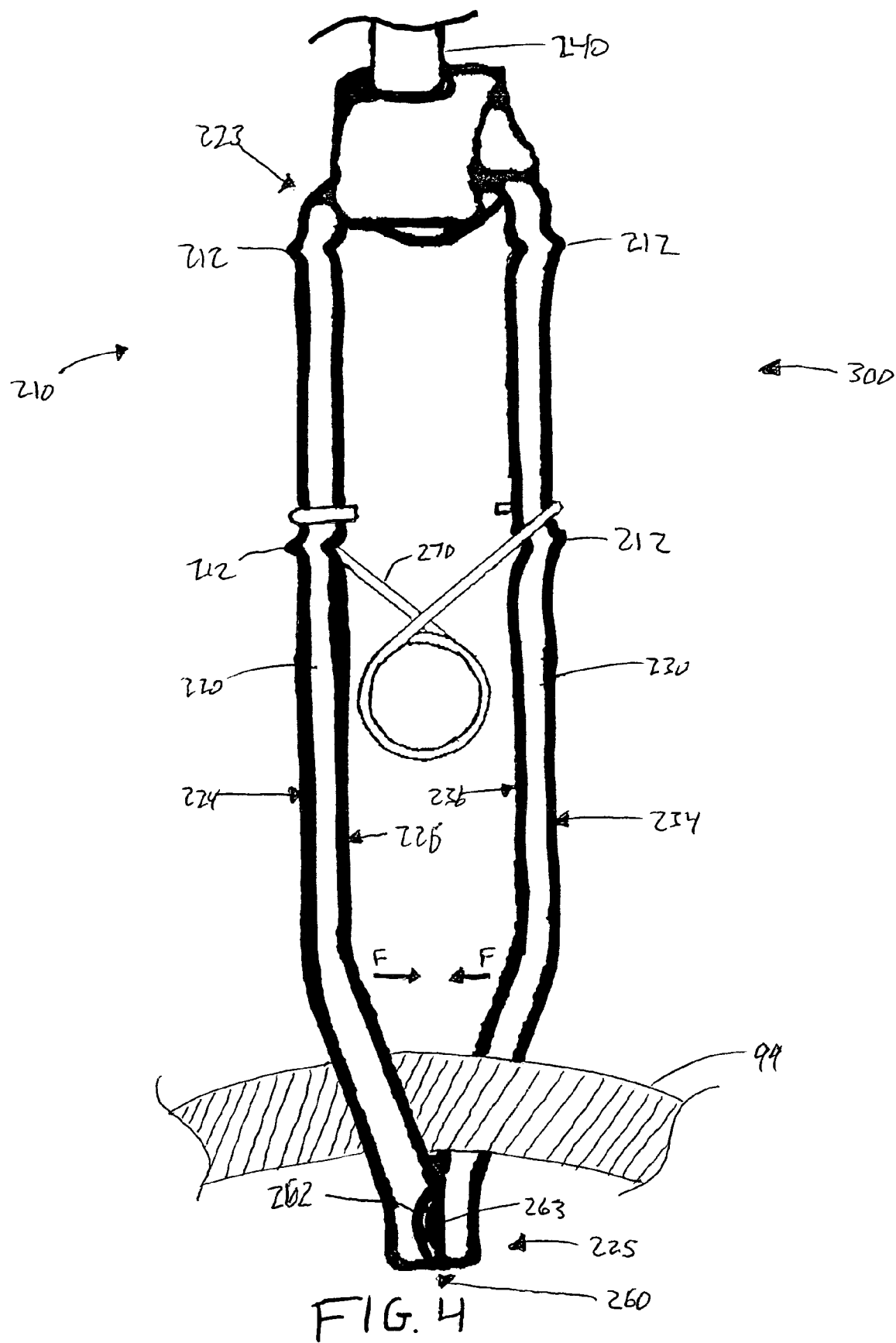
FIG. 4 is a front view of an embodiment of a line support of the present invention.

FIG. 4 illustrates embodiments of a line support 300 of the invention. Line support 300 may include a support member 210 that may have an extended elongate body that may form a loop. The support member 210 may also have a first support arm 220 and a second support arm 230 that may have at least one stop 212. The line support 300 may be optionally suspended from a strap 240 that may releasably attach to securing structures 101 such as, for example, a climbing belt, a belt loop, a body belt, etc. First and second support arms 220, 230 may also be configured to provide support to a line or wire 99 when the line 99 may be positioned through the first and second support arms 220, 230.

The first support arm 220 may have an extended elongated construction and may be opposite from the second support arm 230 wherein the first and second support arms 220, 230 may meet at a proximal end 223 of the support member 210. First support arm 220 may also abut the second support arm 230 at a distal end 225 of the support member 210 wherein the first and second support arms 220, 230 may be separated at the distal end 225. As just described, the first and second support arms 220, 230, may provide a positive biasing force F at the distal end 225. The positive biasing force F may be found where the first support arm 220 has a constant force F pushing against the second support arm 230 at the distal end 225. Thus, first and second support arms 220, 230 may be biased to abut one another. The first support arm 220 may have a first outer surface 224 and a first inner surface 226. The first inner surface 226 may be used for supporting the line 99 when the support member 210 may be employed.

Second support arm 230 may have an extended elongated construction and may be opposite from the first support arm 220. As mentioned above, the first and second support arms 220, 230 may meet at the proximal end 223 of the support member 210 and may form an undivided body. Second support arm 230 may abut the first support arm 220 at the distal end 225 of the support member 210. The first and second support arms 220, 230 may also be separated at the distal end 225. As discussed above, at the distal end 225 of the first and second support arms 220, 230, the positive biasing force F may be provided. The positive biasing force F may be found where the second support arm 230 has a constant force F pushing against the first support arm 220 at the distal end 225. Thus, as mentioned above, the first and second support arms 220, 230 may be biased to abut one another. Second support arm 230 may have a second outer surface 234 and a second inner surface 236. Second inner surface 236 may be used for supporting the line 99 when the support member 210 may be employed.

The line support 300 may also have an alignment retainer 260. Alignment retainer 260 may be provided at the distal end 225 of the support member 210. The alignment retainer 260 may be provided to assist in positioning the first and second support arms 220, 230 in abutment. The alignment retainer 260 may assist in preventing the scissoring of first and second support arms 220, 230 that may be a result of the positive biasing force F. A protrusion 262 may be positioned on the distal end 225 of the first support arm 220 as shown in FIG. 4. A recess 263 may be provided opposite the protrusion 262 and may correspondingly mate with the protrusion 262. The protrusion 262 and corresponding recess 263 may be implemented in a number of fashions such as, for example, a ball and socket, a linear protrusion and linear recess, etc. The alignment retainer 260 may be configured to position and support the support member 210 such that the first and second support arms 220, 230 may be retained in an abutting position by the positive biasing force F. The line 99 may thus be prevented from being damaged, caught or potentially twisting out of the line support 300.

Positioned around the first and second arms 220, 230 and in partial contact with the first and second outer surfaces 224, 234, may be a bias adjustment mechanism 270. The bias adjustment mechanism 270 may be of different configurations such as, for example, a coiled spring, an elastic member, etc. Bias adjustment mechanism 270 may be freely positioned between the parallel portions of the first and second support arms 220, 230. The first and second support arms 220, 230 may be configured to allow positioning by having an extended elongated construction. The closer that bias adjustment mechanism 270 may be secured to the distal end 225, the greater the biasing force F may be provided from the support member 210. Indication marks (not shown) may additionally be provided to communicate the biasing force F created for a given position of the bias adjustment mechanism 270 and may further relate the biasing force F to a number of lines or wires that may be able to be carried up to some range of height or distance before the biasing force F would be overcome. Due to the construction of the bias adjustment mechanism 270, it may be capable of engaging at the first and second support arms 220, 230 and may slide up or down the support member 210 between the stops 212 to manipulate the biasing force F.

The line support 300 may be employed as the line 99 may be positioned through the first and second support arms 220, 230. The line 99 may be retained in a supported position due to the biasing force F that may be provided by the line support 300. To support the line 99, the bias adjustment mechanism 270 may be positioned at any desired position on the parallel portions of the first and second support arms 220, 230 so that the force required to overcome the biasing force F may be adequate for the carrying task. The distal end 225 may be separated so as to open the first support arm 220 and the second support arm 230 when a force sufficient to overcome the biasing force F may be applied. To increase the biasing force F, the bias adjustment mechanism 270 may be slid toward the distal end 225 until it reaches the stops 212. As can be seen in FIG. 4, bias adjustment mechanism 270 has been positioned toward the distal end 225. As discussed above, this position provides a greater biasing force F than if the bias adjustment mechanism 270 were moved closer to the proximal end 223. The alignment retainer 260 may assist in preventing the line support 300 from scissoring.

FIG. 5 illustrates the line support 100 as it may be in use with a lineman 600 on a pole 700. As discussed above, the line 99 may be positioned through the line support 100 and may thus be supported therein. The line support 100 may further be optionally suspended from the strap 40 that may releasably attach to the securing structure 101. As can be seen in the drawing, the lineman 600 is free to work while strapped onto the pole 700 while having the line 99 conveniently positioned and supported.

Other methods of attaching the line supports 100, 200, 300 to securing structures are within the spirit and scope of the embodiments of the invention. The line supports 100, 200, 300 may attach directly to a belt or other securing structure directly. In addition, the line supports 100, 200, 300 may also be carried by hand or otherwise configured to attach to different securing structures.

The alignment retainers 60, 160, 260 of the line supports 100, 200, 300 may also be shaped in a myriad of different shapes to prevent scissoring due to the positive biasing force F applied. Protrusions 63, 163, 263 may be positioned on the first support arm 20, 120, 220 while the recesses 62, 162, 262 may be correspondingly be positioned on the second support arm 30, 130, 230, respectively. Other shapes and designs may be employed for assisting in the prevention of scissoring of the support members 10, 110, 210 when the line support 100, 200, 300 may be employed.

The embodiments of the invention represent significant improvements over line carrying devices. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A line support, comprising:
   a support member having an elongate body forming a loop, the support member configured such that a positive biasing force is provided at a distal end of the line support wherein a first support arm and a second support arm are biased to abut one another and capable of separation at the distal end of the line support when a sufficient force is applied to overcome the biasing force;
   an alignment retainer located at distal ends of the first and second support arms and capable of assisting in positioning the first and second support arms in abutment; and
   a bias adjustment mechanism selectively positionable about the first and second support arms and configured such that the biasing force is selectively adjustable.

2. The line support of claim 1, wherein the alignment retainer has at least one protrusion provided at the distal end of at least one of the first and second support arms and at least one complimentary protrusion recess opposite each at least one protrusion.

3. The line support of claim 1, wherein the bias adjustment mechanism further comprises:
   a first support member;
   a second support member positioned opposite and affixed to the first support member on one end of the bias adjustment mechanism;
   an intermediary support portion positioned between and affixed to the first and second support members wherein the intermediary support portion is located between the first and second support arms;
   a securing support portion affixed to the first and second support members on another end of the bias adjustment mechanism having a threaded bore therethrough; and
   an adjustable fastener extending through the threaded bore and capable of engaging at least one of the first and second support arms and capable of manipulating the biasing force when adjusted.

4. The line support of claim 3, wherein the first and second support members are releasably affixed by at least one fastener at the one end, wherein the intermediary support portion is releasably affixed to the first and second support members by at least one fastener at the another end, and wherein the securing support portion is releasably affixed by at least one fastener to the first and second support members.

5. The line support of claim 3, wherein the adjustable fastener is capable of being adjusted manually.

6. The line support of claim 1, wherein the bias adjustment mechanism further comprises at least one elastic biasing member positioned between the first and second support arms.

7. The line support of claim 6, wherein the bias adjustment mechanism further comprises:
   a first sliding portion positioned about the first support arm;
   a second sliding portion positioned about the second support arm; and
   at least one elastic biasing member positioned between the first and second sliding portions.

8. The line support of claim 1, wherein at least one of the first and second support arms has at least one stop provided and positioned to prevent the bias adjustment mechanism from being maneuvered past the at least one stop.

9. The line support of claim 1, wherein at least one of the first and second support arms provides indicators that relate to the amount of biasing force provided for a given position of the bias adjustment mechanism.

10. The line support of claim 1, wherein at least one of the first and second support arms has an attachment mechanism capable of attaching the line support to a securing structure.

11. A line support, comprising:
    means for supporting a line, the means for supporting having a positive biasing force provided at a distal end of the line support, wherein the means for supporting is biased to abut a separation in the means for supporting at the distal end of the line support and capable of separation when a sufficient force is applied to overcome the biasing force;
    an alignment means located at the distal end of the means for supporting for maintaining the separation of the means for supporting in abutment; and
    an adjustment means for providing a selectively adjustable biasing force, the adjustment means selectively positionable about the means for supporting.

12. The line support of claim 11, wherein the alignment means has a first means for retaining positioned at the distal end of the line support and a second means for retaining opposite the first means for retaining and mating with the first means for retaining, the first means for retaining and second means for retaining provided for retaining the separation in the means for supporting in abutment.

13. The line support of claim 11, wherein the adjustment means is capable of being adjusted manually.

14. The line support of claim 11, wherein the means for supporting further comprises at least one elastic means for providing the biasing force.

15. The line support of claim 11, wherein the means for supporting further comprises stop means for preventing the adjustment means from being maneuvered past the stop means.

16. The line support of claim 11, wherein the line support further comprises an attachment means for attaching the line support to a securing structure.

17. The line support of claim 11, wherein the means for supporting has indication means for relating the amount of biasing force provided for a given position of the adjustment means, the indication means provided on the means for supporting.

\* \* \* \* \*